(12) United States Patent
Allan

(10) Patent No.: US 10,873,524 B2
(45) Date of Patent: Dec. 22, 2020

(54) OPTIMIZED EQUAL-COST MULTI-PATH (ECMP) FORWARDING DECISION IN BIT INDEX EXPLICIT REPLICATION (BIER)

(71) Applicant: Telefonaktiebolaget LM Ericsson (publ), Stockholm (SE)

(72) Inventor: David Ian Allan, San Jose, CA (US)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 165 days.

(21) Appl. No.: 16/064,663

(22) PCT Filed: Jan. 7, 2016

(86) PCT No.: PCT/IB2016/050075
§ 371 (c)(1),
(2) Date: Jun. 21, 2018

(87) PCT Pub. No.: WO2017/118879
PCT Pub. Date: Jul. 13, 2017

(65) Prior Publication Data
US 2019/0014034 A1    Jan. 10, 2019

(51) Int. Cl.
*H04L 12/761*    (2013.01)
*H04L 12/733*    (2013.01)
(Continued)

(52) U.S. Cl.
CPC ........... *H04L 45/16* (2013.01); *H04L 45/122* (2013.01); *H04L 45/24* (2013.01); *H04L 45/745* (2013.01)

(58) Field of Classification Search
None
See application file for complete search history.

(56) References Cited

U.S. PATENT DOCUMENTS

2015/0131658 A1   5/2015  Wijnands et al.
2015/0156106 A1*  6/2015  Allan ................. H04L 45/123
                                                         370/238
(Continued)

OTHER PUBLICATIONS

Eckert, et al., "Traffic Enginering for Bit Index Explicit Replication BIER-TE draft-eckert-bier-te-arch-02" IETF Internet Draft, IETF Trust, Oct. 18, 2015, 30 pages.
(Continued)

*Primary Examiner* — Saba Tsegaye
(74) *Attorney, Agent, or Firm* — Patent Portfolio Builders, PLLC

(57) ABSTRACT

A method implemented by a network device for multicasting packets in a network. The method reduces an overall number of hops that copies of a packet traverse in the network to serve a set of multicast destination nodes. The method includes receiving a packet, determining a first subset of multicast destination nodes that is a subset of the set of multicast destination nodes that is reachable on a shortest path through a first outgoing interface, determining a second subset of multicast destination nodes that is a subset of the set of multicast destination nodes that is reachable on a shortest path through a second outgoing interface, determining whether the first subset of multicast destination nodes is a proper subset of the second subset of multicast destination nodes, and removing the first outgoing interface from consideration in response to determining that the first subset is a proper subset of the second subset.

20 Claims, 8 Drawing Sheets

(51) Int. Cl.
   *H04L 12/707* (2013.01)
   *H04L 12/741* (2013.01)

(56) References Cited

U.S. PATENT DOCUMENTS

2016/0191372 A1* 6/2016 Zhang .................... H04L 45/16
                                                    370/390
2017/0317841 A1* 11/2017 Xu ......................... H04L 12/185

OTHER PUBLICATIONS

Wijnands, et al., "Multicast using Bit Index Explicit Replication draft-ieff-bier-architecture-01," IETF Internet Draft, IETF Trust, Jun. 25, 2015, 35 pages.
Wijnands, et al., "Multicast using Bit Index Explicit Replication draft-ieff-bier-architecture-02," IETF Internet Draft, IETF Trust, Jul. 29, 2015, 36 pages.

* cited by examiner

There are four possible results after ECMP processing
- 16 is served by 2 or 4
- 13 is served by 2 or 5

All solutions are 11 hops

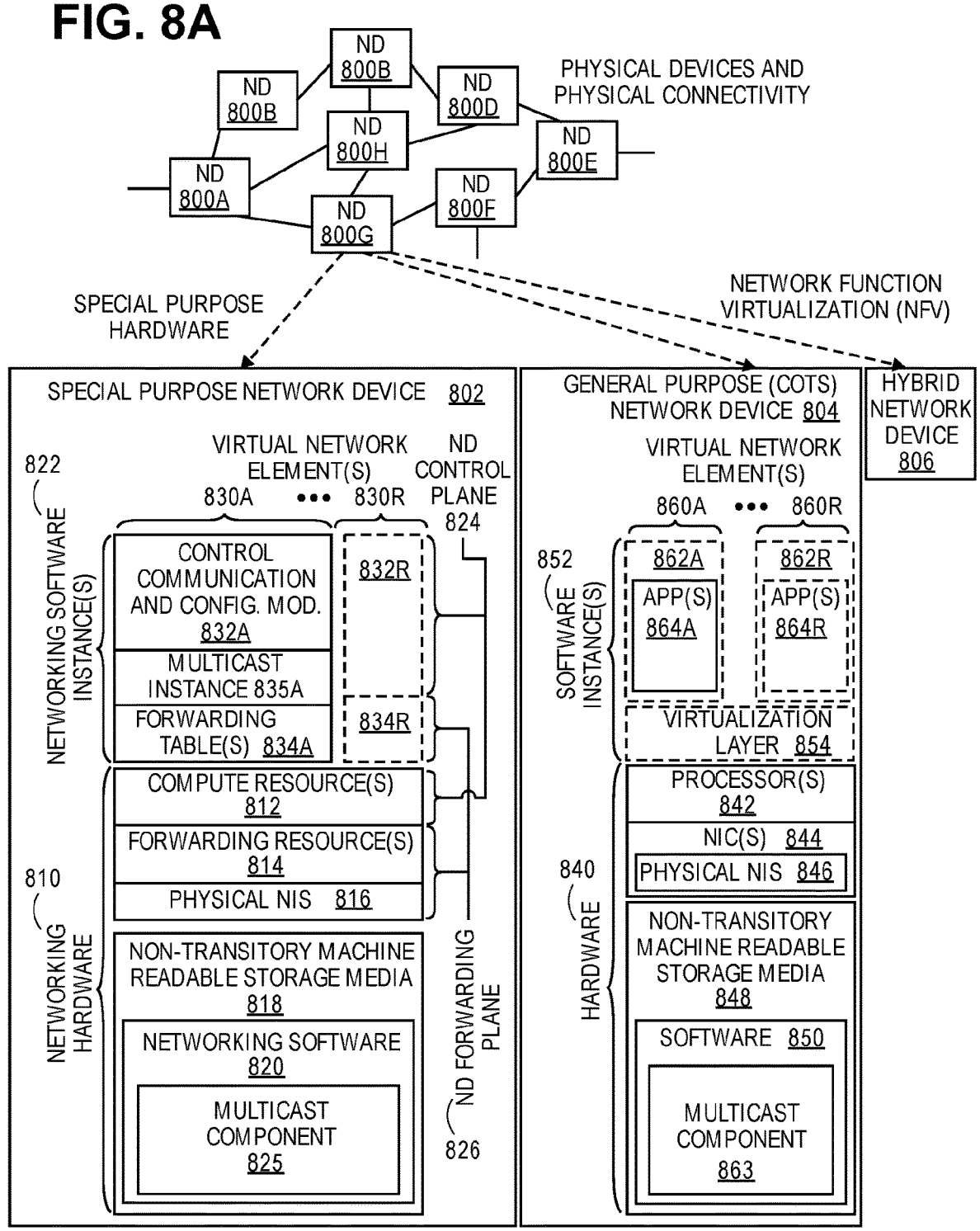

OPTIMIZED EQUAL-COST MULTI-PATH (ECMP) FORWARDING DECISION IN BIT INDEX EXPLICIT REPLICATION (BIER)

CROSS-REFERENCE TO RELATED APPLICATIONS

This application is a national stage of International Application No. PCT/IB2016/050075, filed Jan. 7, 2016, which is hereby incorporated by reference.

FIELD

Embodiments relate to the field of multicast routing. More specifically, embodiments relate to optimizing forwarding decisions in a multipath network that implements Bit Index Explicit Replication (BIER).

BACKGROUND

Traditional multicast distribution of Internet Protocol (IP) packets are supported via IP multicast routing and forwarding, using protocols such as Protocol Independent Multicast (PIM) or Multicast Label Distribution Protocol (LDP) to create multicast replication states on the nodes along the multicast distribution tree in the network. Packets flowing through the network will be replicated to the proper set of neighbors according to the replication state stored at each node.

The multicast forwarding states are difficult to aggregate since each application may have a different set of participants. This can cause an explosion of multicast state in the core of the network where multicast traffic passes through.

Bit Index Explicit Replication (BIER) is a multicast technique whereby the set of multicast destination nodes for a packet is encoded in a bitmap carried in a packet header. Since the set of destination nodes are encoded in the packet header, this reduces the amount of multicast state that needs to be stored at network nodes. A given node uses a unicast forwarding solution to determine the set of outgoing interfaces for a packet. When a node forwards a packet through a chosen outgoing interface, the node prunes the bits in the bitmap to eliminate nodes not on the shortest path on the chosen outgoing interface. This ensures that duplicate delivery does not occur and ensures that transient loops do not cause an exponential increase in bandwidth consumption.

The amount of bandwidth a BIER implementation will use for multicasting a packet to a given set of destination nodes in an Equal-Cost Multi-Path (ECMP) environment will be a random function of the entropy value specified in the packet. Where possible, it is desirable to reduce the likelihood of ECMP processing resulting in excessive bandwidth consumption.

SUMMARY

A method is implemented by a network device for multicasting packets in a multipath network. The method reduces an overall number of hops that copies of a packet traverse in the network to serve a set of multicast destination nodes. The method includes receiving the packet, where the packet is encapsulated in a header that identifies the set of multicast destination nodes, determining a first subset of multicast destination nodes, where the first subset of multicast destination nodes is a subset of the set of multicast destination nodes that is reachable on a shortest path through a first outgoing interface of the network device, determining a second subset of multicast destination nodes, where the second subset of multicast destination nodes is a subset of the set of multicast destination nodes that is reachable on a shortest path through a second outgoing interface of the network device, determining whether the first subset of multicast destination nodes is a proper subset of the second subset of multicast destination nodes, and removing the first outgoing interface from consideration as a candidate outgoing interface through which to forward the packet in response to determining that the first subset of multicast destination nodes is a proper subset of the second subset of multicast destination nodes.

A network device is configured to multicast packets in a multipath network. The network device is configured to reduce an overall number of hopes that copies of a packet traverse in the network to serve a set of multicast destination nodes. The network device includes a non-transitory machine-readable storage medium having stored therein a multicast component and a processor communicatively coupled to the non-transitory machine-readable storage medium. The processor is configured to execute the multicast component. The multicast component is configured to receive the packet, where the packet is encapsulated in a header that identifies the set of multicast destination nodes, determine a first subset of multicast destination nodes, where the first subset of multicast destination nodes is a subset of the set of multicast destination nodes that is reachable on a shortest path through a first outgoing interface of the network device, determine a second subset of multicast destination nodes, where the second subset of multicast destination nodes is a subset of the set of multicast destination nodes that is reachable on a shortest path through a second outgoing interface of the network device, determine whether the first subset of multicast destination nodes is a proper subset of the second subset of multicast destination nodes and remove the first outgoing interface from consideration as a candidate outgoing interface through which to forward the packet in response to determining that the first subset of multicast destination nodes is a proper subset of the second subset of multicast destination nodes.

A non-transitory machine-readable medium has computer code stored therein that is to be executed by a set of one or more processors of a network device. The computer code, when executed by the network device, causes the network device to perform operations for multicasting packets in the network. The operations to reduce an overall number of hops that copies of a packet traverse in the network to serve a set of multicast destination nodes. The operations include receiving the packet, where the packet is encapsulated in a header that identifies the set of multicast destination nodes, determining a first subset of multicast destination nodes, where the first subset of multicast destination nodes is a subset of the set of multicast destination nodes that is reachable on a shortest path through a first outgoing interface of the network device, determining a second subset of multicast destination nodes, where the second subset of multicast destination nodes is a subset of the set of multicast destination nodes that is reachable on a shortest path through a second outgoing interface of the network device, determining whether the first subset of multicast destination nodes is a proper subset of the second subset of multicast destination nodes, and removing the first outgoing interface from consideration as a candidate outgoing interface through which to forward the packet in response to determining that the first subset of multicast destination nodes is a proper subset of the second subset of multicast destination nodes.

A computing device implements a plurality of virtual machines for implementing network function virtualization (NFV). A virtual machine from the plurality of virtual machines is configured to multicast packets in a multipath network. The virtual machine is configured to reduce an overall number of hopes that copies of a packet traverse in the network to serve a set of multicast destination nodes. The computing device includes a non-transitory machine-readable storage medium having stored therein a multicast component and a processor communicatively coupled to the non-transitory machine-readable storage medium. The processor is configured to execute the virtual machine, where the virtual machine is configured to implement the multicast component. The multicast component is configured to receive the packet, where the packet is encapsulated in a header that identifies the set of multicast destination nodes, determine a first subset of multicast destination nodes, where the first subset of multicast destination nodes is a subset of the set of multicast destination nodes that is reachable on a shortest path through a first outgoing interface of the network device, determine a second subset of multicast destination nodes, where the second subset of multicast destination nodes is a subset of the set of multicast destination nodes that is reachable on a shortest path through a second outgoing interface of the network device, determine whether the first subset of multicast destination nodes is a proper subset of the second subset of multicast destination nodes and remove the first outgoing interface from consideration as a candidate outgoing interface through which to forward the packet in response to determining that the first subset of multicast destination nodes is a proper subset of the second subset of multicast destination nodes.

BRIEF DESCRIPTION OF THE DRAWINGS

The invention may best be understood by referring to the following description and accompanying drawings that are used to illustrate embodiments of the invention. In the drawings:

FIG. 8A illustrates connectivity between network devices (NDs) within an exemplary network, as well as three exemplary implementations of the NDs, according to some embodiments.

FIG. 8B illustrates an exemplary way to implement a special-purpose network device, according to some embodiments.

DESCRIPTION OF EMBODIMENTS

Figure 1:
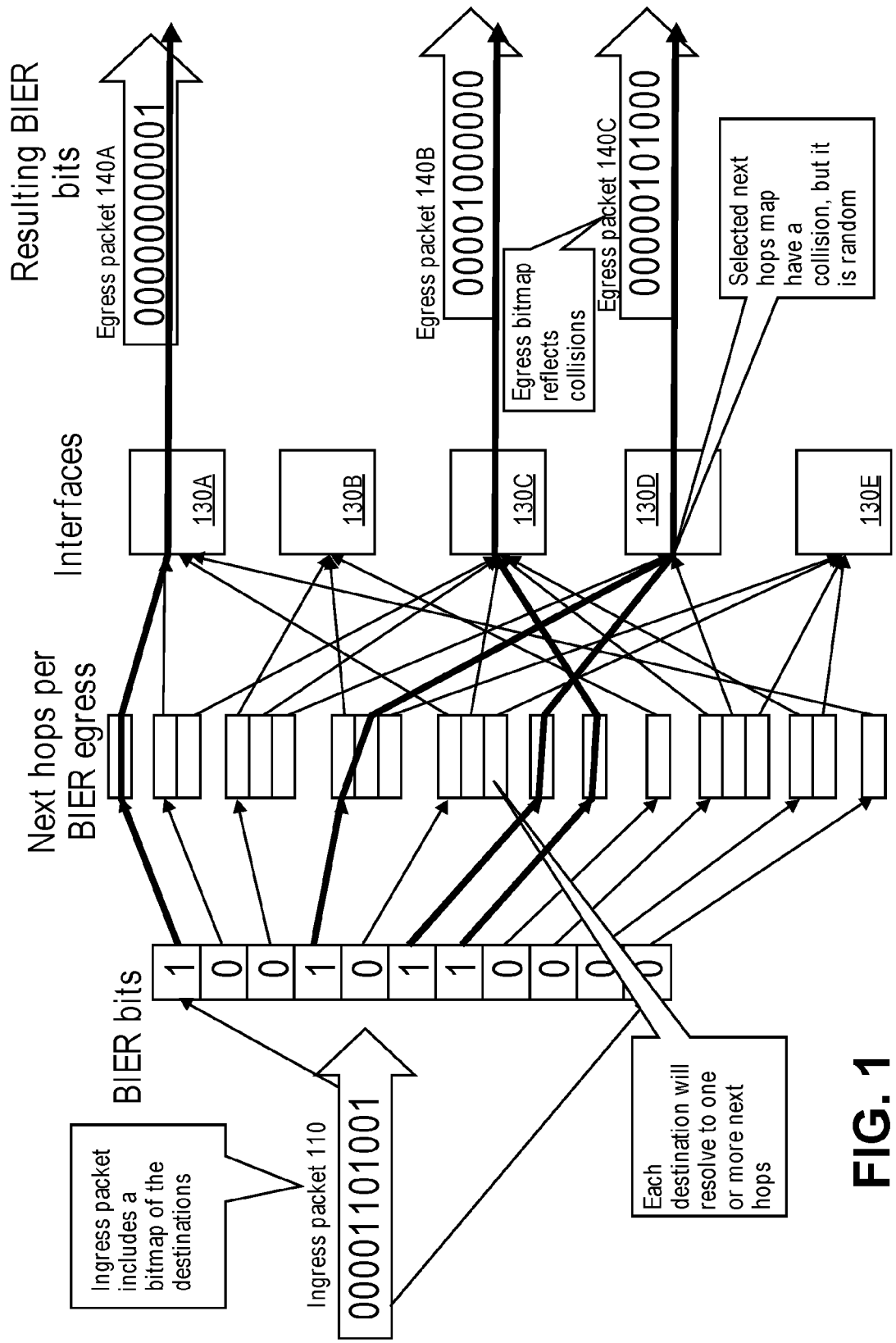
FIG. 1 is a diagram illustrating packet forwarding decisions made by a BFR, according to some embodiments.

The following description describes methods and apparatus to optimize forwarding decisions in a network that implements Bit Index Explicit Replication (BIER). In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

BIER is an architecture for the forwarding of multicast data packets where multicast group information is encoded directly in the packet headers. BIER does not require any explicit tree-building protocol and does not require intermediate nodes to maintain per-group state. A network device or router that supports the BIER is referred to herein as a Bit-Forwarding Router (BFR). BIER control plane protocols run within a BIER domain, allowing the BFRs within that domain to exchange necessary routing information.

A BIER domain is a connected set of BFRs. This may be via direct adjacencies or by tunnels spanning non-BIER compliant portions of the network. A multicast data packet enters a BIER domain at a Bit-Forwarding Ingress Router (BFIR) and leaves the BIER domain at one or more Bit-Forwarding Egress Routers (BFERs). A BFR that receives a multicast data packet from another BFR in the same BIER domain is referred to herein as a transit BFR for that packet. Each BFR that is capable of acting as a BFIR or BFER is assigned a BFR identifier (BFR-id) that is unique within the BIER domain. When a multicast data packet enters the BIER domain, a BFIR determines the set of destination BFERs to which the packet needs to be delivered. The BFIR encapsulates the packet in a BIER header, which includes a bitstring, in which each bit represents a BFR-id. To indicate that a particular BFER needs to receive the packet, the BFIR sets (or "turns on" or "flags") the bit in the bitstring corresponding to the BFR-id of that BFER.

A given BFR uses a unicast forwarding solution to determine the set of outgoing interfaces for a packet. When the BFR forwards a packet through a chosen outgoing interface, the BFR prunes the bits in the bitmap to eliminate destination BFERs not reachable via the unicast shortest path solution on the chosen outgoing interface. With this forwarding procedure, a multicast data packet can follow a shortest path from the BFIR to each destination BFER. Since the set of destination BFERs for a given packet is explicitly encoded into the BIER header, the packet is not delivered to destination BFERs that do not need to receive the packet. This allows for efficient forwarding of multicast traffic. This efficient forwarding is achieved without any need for transit BFRs to maintain per-group state or run a multicast tree-building protocol.

An overview of the BIER architecture is described above to aid the understanding of embodiments described herein. For clarity and ease of understanding, some details of the BIER architecture have been omitted. A more detailed description of the BIER architecture is described in the Internet Engineering Task Force (IETF) draft titled, "Multicast using Bit Index Explicit Replication" (published Jul. 29, 2015 as draft-ietf-bier-architecture-02), which is hereby incorporated by reference.

In multipath networks, the routing underlay will provide multiple equal cost paths from a given node to a given destination node. When forwarding multicast packets through a multipath network, it can be beneficial to take advantage of the multiple equal cost paths by load balancing among the paths. This feature is known as Equal Cost Multiple Path forwarding or ECMP. Under existing BIER implementations, which path (among equal-cost paths) a node (e.g., a BFR) chooses is a random function of the entropy used. This choice can have an impact on the overall number of hops that copies of a packet traverse in the network (and thus also impact the bandwidth consumption in the network) to serve a set of destination nodes. Thus, the amount of bandwidth a BIER implementation will consume for multicasting a packet from a root node to a given set of destination nodes in an ECMP environment will be a random function of the entropy value specified in the packet, which can result in more bandwidth consumption than necessary.

Embodiments described herein overcome the disadvantages of existing techniques by providing a mechanism that optimizes multicast forwarding decisions of a node in a multipath network. The optimized multicast forwarding decisions result in fewer overall hops for copies of a packet to traverse to serve a set of destination nodes. Various embodiments are described and claimed herein below.

FIG. 1 is a diagram illustrating packet forwarding decisions made by a BFR, according to some embodiments. As illustrated, an ingress packet 110 is encapsulated in a BIER header having a bitstring of "00001101001." The bitstring has 11 bits, where each bit corresponds to a BFR-id of a BFR. By convention, the least significant (rightmost) bit in the bitstring is designated as bit 1 and the most significant (leftmost) bit is designated as bit 11 (with bits in between designated accordingly). Bit 1 corresponds to BFR-id 1, bit 2 corresponds to BFR-id 2, and so on. The bitstring identifies the set of destination BFRs (e.g., BFERs) to which a copy of the ingress packet 110 should be delivered. As shown, bits 1, 4, 6, and 7 are set (or "turned on") in the bitstring of the ingress packet, indicating that a copy of the ingress packet should be delivered to BFRs having BFR-ids 1, 4, 6, and 7, respectively. The bitstring that identifies the destination nodes to which a copy of a given packet should be delivered is referred to herein as a destination bitstring associated with the given packet.

In an ECMP environment, each destination BFR may be reached on a shortest path using one or more next hops. For example, the destination BFRs corresponding to bit 1, bit 6, and bit 7, respectively, only have a single outgoing next hop that is on the shortest path. The destination BFR corresponding to bit 4, however, can be reached on the shortest path via any one of three next hops. A packet can be forwarded to a next hop through a corresponding outgoing interface (e.g., interfaces 130A-E).

Since there is only a single next hop that can be used to forward the packet towards the destination BFR corresponding to bit 1 (i.e., the BFR having BFR-id 1), the packet is forwarded towards the destination BFR corresponding to bit 1 using that next hop through interface 130A as egress packet 140A. Also, since the destination BFR corresponding to bit 1 is the only destination BFR to be reached through that next hop, the egress packet 140A is encapsulated in a BIER header having a bitstring in which all bits are cleared except for bit 1. Similarly, since there is only a single next hop that can be used to forward the packet towards the destination BFR corresponding to bit 7, the packet is forwarded towards the destination BFR corresponding to bit 7 using that next hop through interface 130C as egress packet 140B. Also, since the destination BFR corresponding to bit 7 is the only destination BFR to be reached through that next hop, the egress packet 140B is encapsulated in a BIER header having a bitstring in which all bits are cleared except for bit 7.

As illustrated, the destination BFR corresponding to bit 4 can be reached using any one of 3 different next hops. Typically, which next hop to choose among the equal-cost next hops is based on an entropy value specified in the packet. For example, the next hop can be chosen by calculating the entropy modulo next hop count. As such, next hop selection is a random function of the entropy value in the BIER packet header.

In this example, the next hop chosen to reach the destination BFR corresponding to bit 4 and the next hop to reach the destination BFR corresponding to bit 6 is the same. As such, the packet is forwarded towards both BFRs using the same next hop through interface 130D as egress packet 140C. The egress packet 140C is encapsulated in a BIER header having a bitstring in which all bits are cleared except for bits 4 and 6. In this example, the next hop chosen to reach the destination BFR corresponding to bit 4 collides with the next hop to reach the destination BFR corresponding to bit 6, but this collision is essentially a random function of the entropy value specified in the packet. This randomness involved in choosing the next hop can have an impact on the overall number of hops that copies of a packet traverse in the network (and thus also impact the bandwidth consumption in the network) to serve a set of destination nodes. In other words, the amount of bandwidth a BIER implementation will use for multicasting a packet to a given set of destination nodes in an ECMP environment will be a random function of the entropy value specified in the packet, which can result in consuming more bandwidth than necessary.

Figure 2:
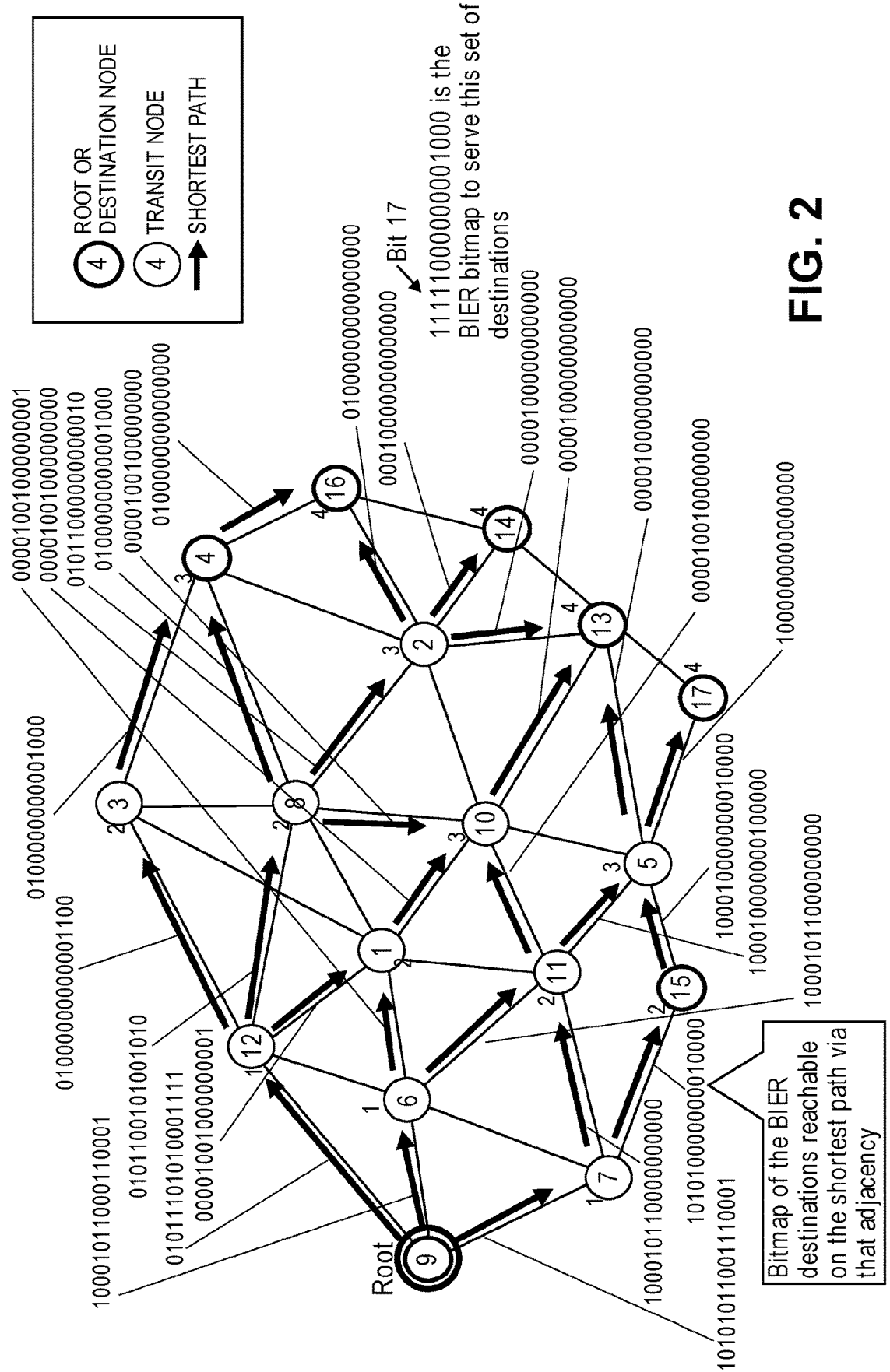
FIG. 2 is a diagram illustrating the shortest paths in a multipath network, according to some embodiments.
Figure 3:
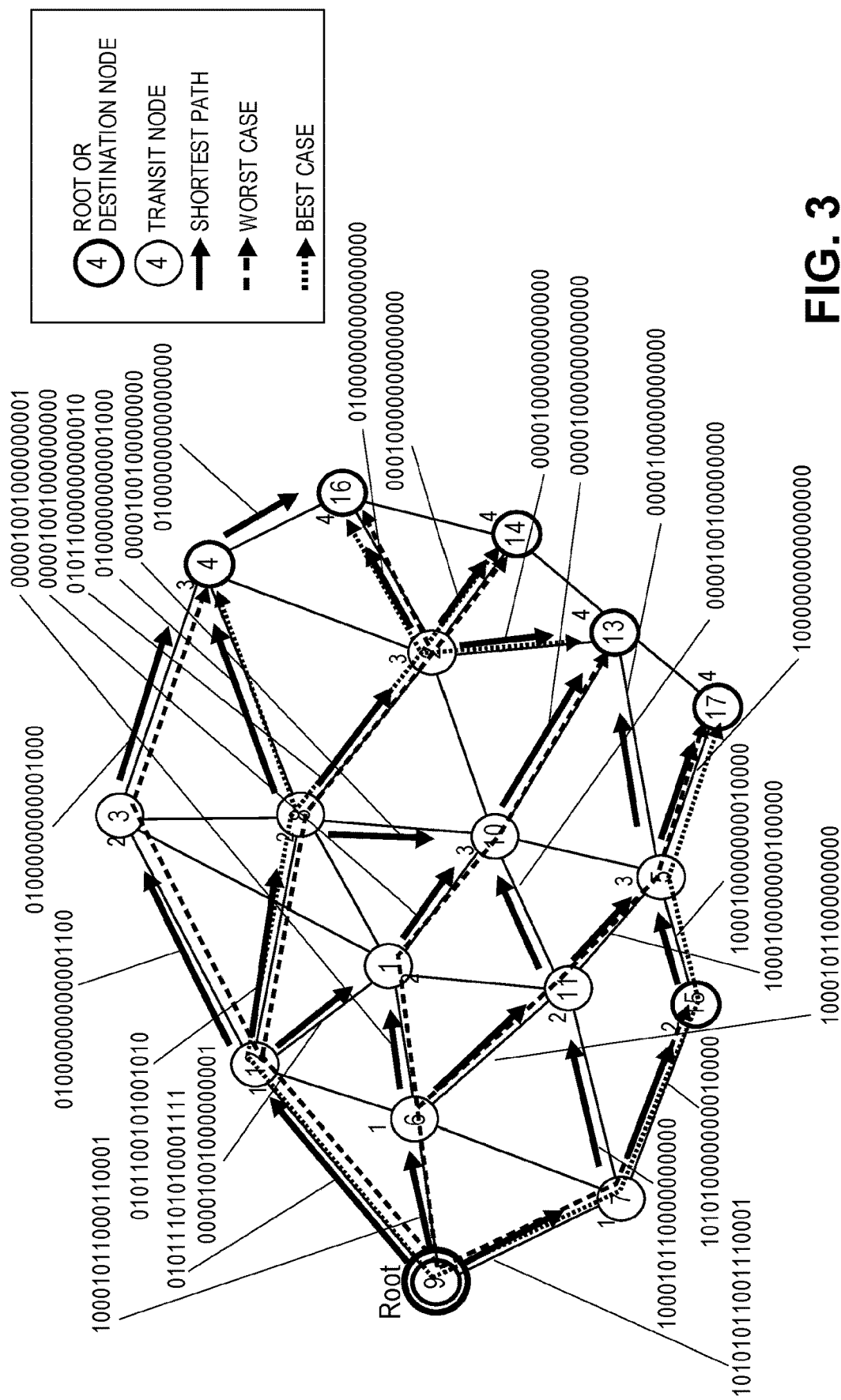
FIG. 3 is a diagram illustrating a best case scenario and a worst case scenario for packet forwarding in a multipath network, according to some embodiments.

FIG. 2 and FIG. 3 illustrate an example of how ECMP processing of a packet can result in inefficient packet forwarding in a multipath network, according to some embodiments.

FIG. 2 is a diagram illustrating the shortest paths in a multipath network, according to some embodiments. As illustrated, the network includes 17 nodes (nodes 1-17). Each node is a BFR. Node 9 is a root node. The root node is to forward a packet towards a set of destination nodes. In the example shown, the destination bitstring associated with the packet is "11111000000001000." As used herein, the destination bitstring associated with a packet refers to the bitstring that identifies the nodes to which a copy of that packet should be delivered. The destination bitstring in this example indicates that nodes 4, 13, 14, 15, 16, and 17 are the nodes to which a copy of the packet should be delivered. Thus, these nodes are referred to as destination nodes. The remaining nodes (the nodes that are not a root node or a destination node) are transit nodes. The arrows indicate the links that are on the shortest path from the root node to the other nodes in the network. The number adjacent to each of the transit nodes and destination nodes indicates the number of hops that it takes to reach that node on a shortest path starting from the root node. For example, nodes 6, 7, and 12 are designated with a number 1 since they can be reached from the root node on a shortest path using 1 hop. Nodes 1, 3, 8, 11, and 15 are designated with a number 2 since they can be reached from the root node on a shortest path using 2 hops. Nodes 2, 4, 5, and 10 are designated with a number 3 since they can be reached from the root node on a shortest path using 3 hops. Nodes 13, 14, 16, and 17 are designated with a number 4 since they be reached from the root node on a shortest path using 4 hops. The bitstring corresponding to each arrow is an outgoing interface bitstring associated with that adjacency or outgoing interface. The outgoing interface bitstring associated with an adjacency or outgoing interface identifies the nodes that are reachable on a shortest path via that adjacency or outgoing interface. For example, the adjacency from node 7 to node 15 is associated with bitstring "10101000000010000." This indicates that nodes 5, 13, 15, and 17 can be reached from node 7 on a shortest path via this adjacency. The adjacency from a node X to a node Y may be denoted herein as adjacency X-Y. For example, the adjacency from node 7 to node 15 may be denoted as adjacency 7-15.

FIG. 3 is a diagram illustrating a best case scenario and a worst case scenario for packet forwarding in a multipath network, according to some embodiments. From FIG. 3 it can be seen that ECMP processing of packets can result in inefficient packet forwarding. In a best case scenario, as illustrated in the drawing, copies of the packet traverse a total of 11 hops to serve the destination nodes. However, in a worst case scenario, as illustrated in the drawing, copies of the packet traverses a total of 16 hops to serve the destination nodes. Which path the packet will end up traversing to reach the destination nodes depends on how nodes choose to tie-break between multiple equal-cost next hops. An example of the inefficiency introduced in the worst case scenario can be seen from node 9 choosing to use node 6 as the next hop to reach node 17, when instead, it could have used node 7 as the next hop to reach node 17 (which is already being used as the next hop to reach node 15). Similar inefficiencies exist elsewhere in the network in the worst case scenario. For example, in the worst case scenario, node 12 chooses to use node 3 as the next hop to reach node 4, when instead, it could have used node 8 as the next hop to reach node 4 (which is already being used as the next hop to reach nodes 14 and 16).

In one embodiment, nodes can apply a heuristic to improve overall packet forwarding efficiency in the network. For example, a node that receives a packet for forwarding applies the heuristic by taking the logical (bit-wise) AND of the destination bitstring associated with the packet (i.e., a bitstring identifying the destination nodes) and the outgoing interface bitstring associated with a given outgoing interface of the node (the bitstring identifying the nodes that can be reached on a shortest path through the given outgoing interface). If the set of bits flagged in the resulting bitstring is a proper subset of the set of bits flagged in the logical (bit-wise) AND of the destination bitstring associated with the packet and the outgoing interface bitstring associated with any other outgoing interface, then the node removes the given outgoing interface from consideration for forwarding the packet. State more generally, a given outgoing interface of a node is removed from consideration if the set of destination nodes reachable through the given outgoing interface is a proper subset of the set of destination nodes that are reachable through any other outgoing interface of the node, as this will result in fewer overall packet hops by keeping the multicast distribution tree aggregated for as long as possible.

Figure 4:
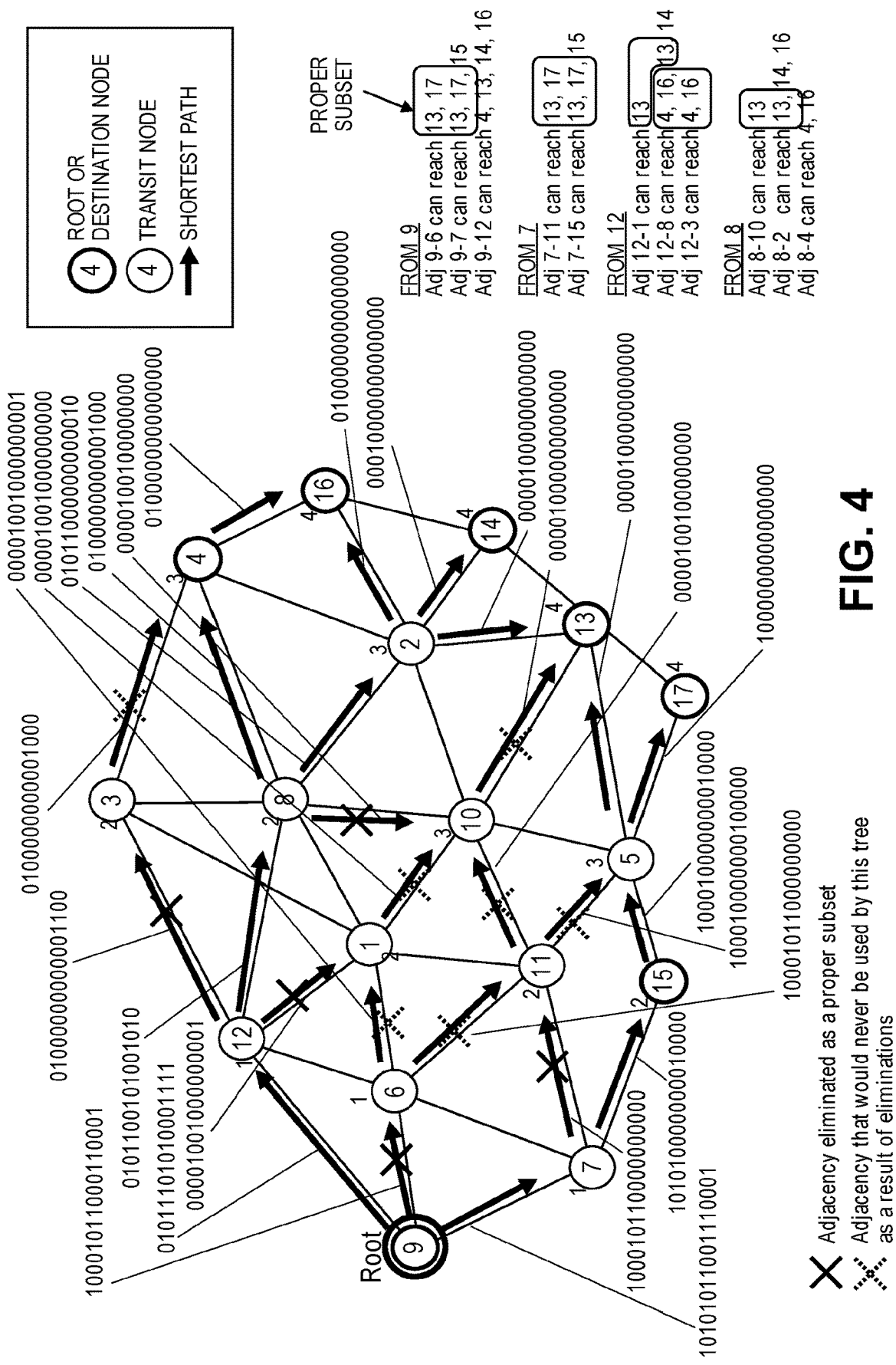
FIG. 4 is a diagram illustrating interfaces/adjacencies that can be removed from consideration in order to improve overall packet forwarding efficiency in a multipath network, according to some embodiments.

FIG. 4 is a diagram illustrating interfaces/adjacencies that can be removed from consideration in order to improve overall packet forwarding efficiency in a multipath network, according to some embodiments. Packet forwarding starts at the root node (i.e., node 9). The packet to be forwarded is associated with a destination bitstring of "11111000000001000," indicating that the destination nodes are nodes 4, 13, 14, 15, 16, and 17. From node 9, adjacency 9-6 can reach destination nodes 13 and 17, adjacency 9-7 can reach destination nodes 13, 17, and 15, and adjacency 9-12 can reach destination nodes 4, 13, 14, and 16. The set of destination nodes reachable through a given outgoing interface for a given packet can be determined by taking the logical AND of the destination bitstring associated with the packet and the outgoing interface bitstring associated with the given outgoing interface. For example, the set of destination nodes reachable through adjacency/interface 9-6 can be determined by taking the logical (bit-wise) AND of the destination bitstring ("11111000000001000") and the outgoing interface bitstring associated with adjacency/interface 9-6 ("1000101100011000"). The resulting bitstring of the logical (bit-wise) AND operation is "10001000000000000," which indicates that the set nodes reachable through adjacency 9-6 is nodes 13 and 17. Similar operations can be performed to determine the set of destination nodes reachable through the other outgoing adjacencies/interfaces. Since the set of destination nodes that are reachable through adjacency 9-6 is a proper subset of the set of destination nodes that are reachable through adjacency 9-7, adjacency 9-6 is removed from consideration for the processing of the current packet.

From node 7, adjacency 7-11 can reach destination nodes 13 and 17 and adjacency 7-15 can reach destination nodes 13, 17, and 15. Since the set of destination nodes that are reachable through adjacency 7-11 is a proper subset of the set of destination nodes that are reachable through adjacency 7-15, adjacency 7-11 is removed from consideration.

From node 12, adjacency 12-1 can reach destination node 13, adjacency 12-8 can reach destination nodes 4, 16, 13, and 14, and adjacency 12-3 can reach destination nodes 4 and 16. Since the set of destination nodes that are reachable through adjacency 12-1 is a proper subset of the set of destination nodes that are reachable through adjacency 12-8, adjacency 12-1 is removed from consideration. Also, since the set of destination nodes that are reachable through adjacency 12-3 is a proper subset of the set of destination nodes that are reachable through adjacency 12-8, adjacency 12-3 is also removed from consideration.

From node 8, adjacency 8-10 can reach destination node 13, adjacency 8-2 can reach destination nodes 13, 14, and 16, and adjacency 8-4 can reach destination nodes 4 and 16. Since the set of destination nodes that are reachable through adjacency 8-10 is a proper subset of the set of destination nodes that are reachable through adjacency 8-2, adjacency 8-10 is removed from consideration.

As a result of adjacencies 9-6, 7-11, 12-1, 12-3, and 8-10 being removed from consideration, adjacencies 6-1, 6-11, 1-10, 11-10, 11-5, 3-4, and 10-13 will also not be used for forwarding the packet. It should be noted that if node 11 were to receive a packet destined for nodes 13 and 17 (but not node 10), node 11 could use the heuristic described above to eliminate adjacency 11-10 from consideration. However, in this example, node 11 will not receive such a packet due to the elimination of upstream adjacencies. As a result of removing certain adjacencies from consideration, packet forwarding paths that cause inefficient packet forwarding are eliminated.

Figure 5:
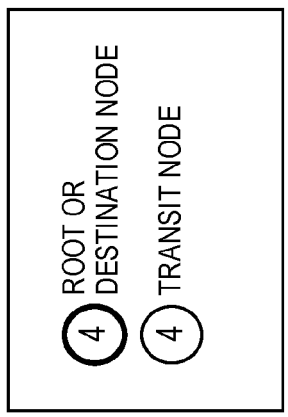
FIG. 5 is a diagram illustrating possible packet forwarding paths after certain adjacencies are removed from consideration, according to some embodiments.
Figure 5:
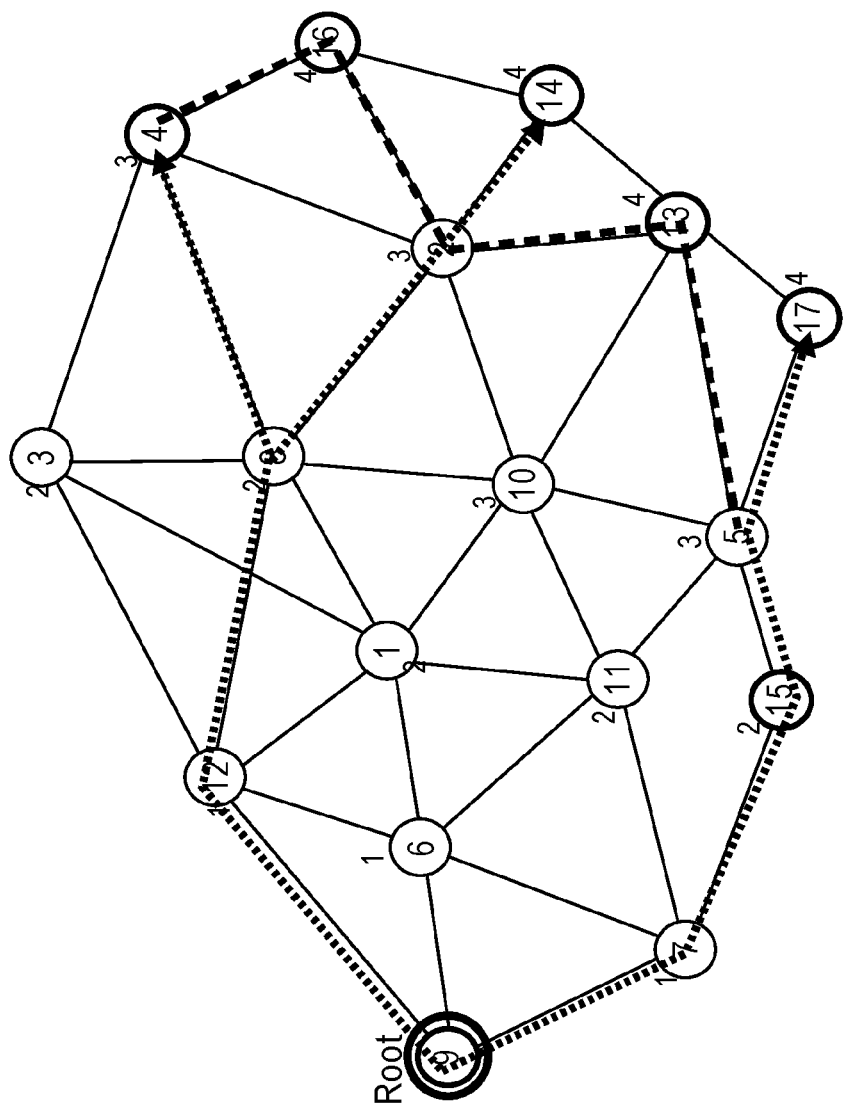

FIG. 5 is a diagram illustrating possible packet forwarding paths after certain adjacencies are removed from consideration, according to some embodiments. After the nodes apply a heuristic to remove certain adjacencies from consideration, there are four possible packet forwarding paths that remain and all of these paths have a total of 11 hops. This is an improvement over the worst case scenario described with reference to FIG. 3 that had 16 total hops. Node 16 can be served by either node 2 or node 4. Node 13 can be served by either node 2 or node 5. In any of these cases, the total number of hops is still 11 hops. Thus, it can be seen that removing certain adjacencies on a per packet basis as described herein can improve overall packet forwarding efficiency by reducing the overall number of hops that copies of a packet traverse in a network to serve a set of destination nodes.

Figure 6:
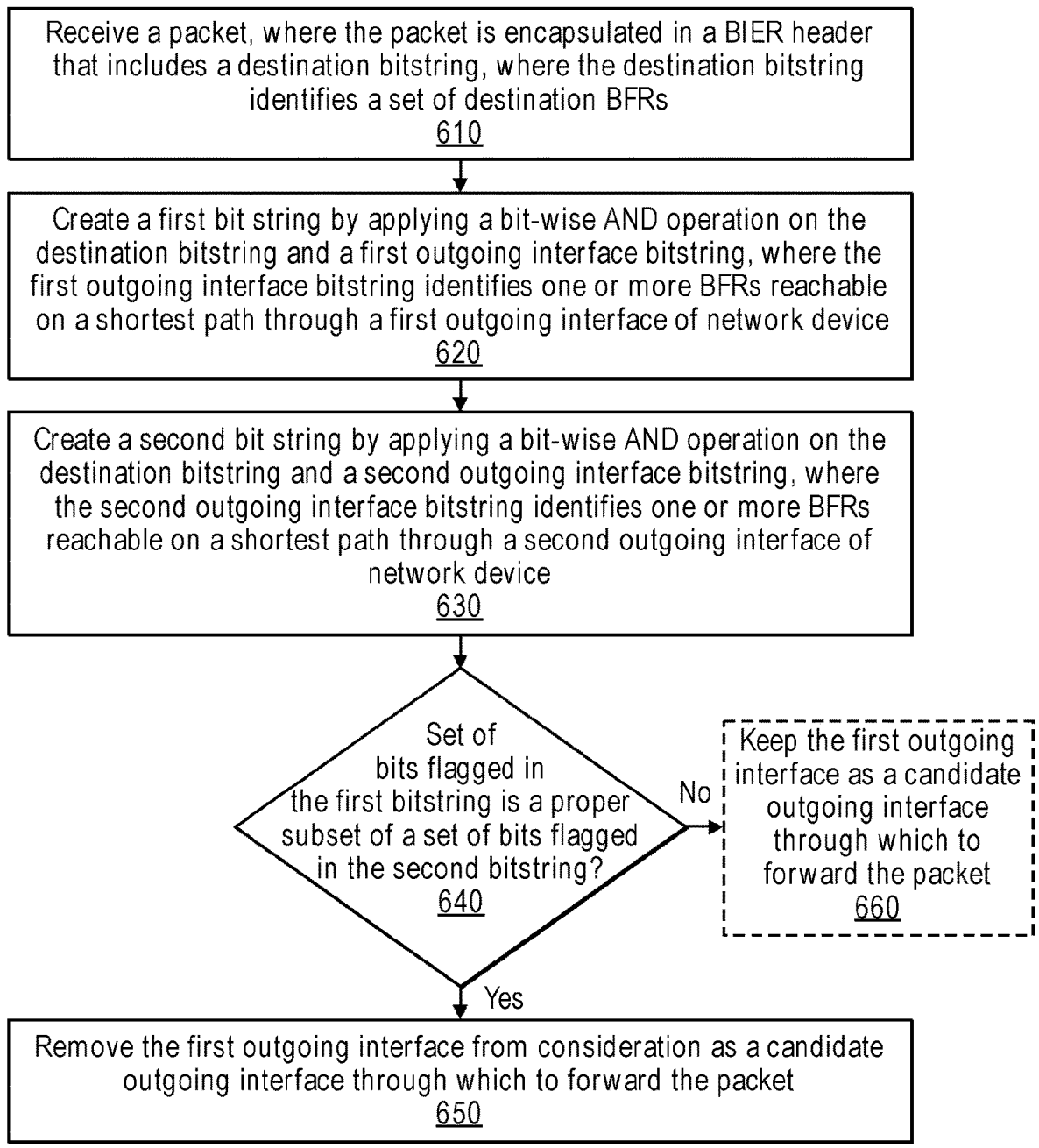
FIG. 6 is a flow diagram of a process for multicasting packets in a multipath network that implements BIER, according to some embodiments.

FIG. 6 is a flow diagram of a process for multicasting packets in a multipath network that implements BIER, according to some embodiments. The process reduces the overall number of hops that copies of a packet traverse in the network to serve a set of destination BFRs. In one embodiment, the process may be implemented by a network device (e.g., a BFR).

In one embodiment, the process is initiated when the network device receives a packet, where the packet is encapsulated in a BIER header that includes a destination bitstring (block 610). The destination bitstring identifies a set of destination BFRs to which a copy of the packet should be delivered.

The network device creates a first bitstring by applying a bit-wise AND operation on the destination bitstring and a first outgoing interface bitstring (block 620). The first outgoing interface bitstring identifies one or more BFRs that are reachable on a shortest path through a first outgoing interface of the network device. In one embodiment, the network device may determine the first outgoing interface bitstring based on information stored in a Bit Index Routing Table (BIRT) or a Bit Index Forwarding Table (BIFT).

The network device creates a second bitstring by applying a bit-wise AND operation on the destination bitstring and a second outgoing interface bitstring (block 630). The second outgoing interface bitstring identifies one or more BFRs that are reachable on a shortest path through a second outgoing interface of the network device, where the second outgoing interface is different from the first outgoing interface. In one embodiment, the network device may determine the second outgoing interface bitstring based on information stored in a Bit Index Routing Table (BIRT) or a Bit Index Forwarding Table (BIFT).

The network device then determines whether the set of bits flagged in the first bitstring is a proper subset of the set of bits flagged in the second bitstring (decision block 640). A proper subset of a set X is a subset of set X that is not equal to set X. Stated differently, if a set Y is a proper subset of X, then all elements of set Y are in set X, but set X contains at least one element that is not in set Y.

If the network device determines that the set of bits flagged in the first bitstring is a proper subset of the set of bits flagged in the second bitstring, then the network device removes the first outgoing interface from consideration as a candidate outgoing interface through which to forward the packet (block 650). On the other hand, if the network device determines that the set of bits flagged in the first bitstring is not a proper subset of the set of bits flagged in the second bitstring, then the network device keeps the first outgoing interface as a candidate outgoing interface through which to forward the packet (block 660).

The network device may repeat blocks 620-660 until the network device determines that all outgoing interfaces of the network device that can only serve a proper subset of the set of multicast destination BFRs that can be served by any other outgoing interface of the network device have been removed from consideration. In one embodiment, the network device may ensure this by repeating blocks 620-660 for each possible ordered pair of outgoing interfaces. For example, if the network device has a total of 3 outgoing interfaces labeled X, Y, and Z, respectively, then the network device performs blocks 620-660 for the pairs (X, Y), (Y, X), (X, Z), (Z, X), (Y, Z), and (Z, Y), respectively, where the first entry in the pair is treated as the first outgoing interface and the second entry in the pair is treated as the second outgoing interface.

The network device may then determine one or more outgoing interfaces through which to forward the packet among the one or more candidate outgoing interfaces that were not removed from consideration and forward the packet through the one or more determined outgoing interfaces. Forwarding the packet through an outgoing interface may involve making a copy of the packet, encapsulating the copy of the packet in a BIER header with an updated destination bitstring (e.g., by pruning bits in the destination bitstring to eliminate nodes not reachable on the outgoing interface), and transmitting the copy of the packet through the outgoing interface.

It is possible that even after removing certain outgoing interfaces from consideration (e.g., by applying the process described above or similar process), that there are multiple outgoing interfaces available through which a packet can be forwarded to reach a given destination BFR. In one embodiment, the network device tie-breaks between these outgoing interfaces (the candidate outgoing interfaces that were not removed from consideration) using an entropy value either specified in the packet or gleaned from packet information.

Figure 7:
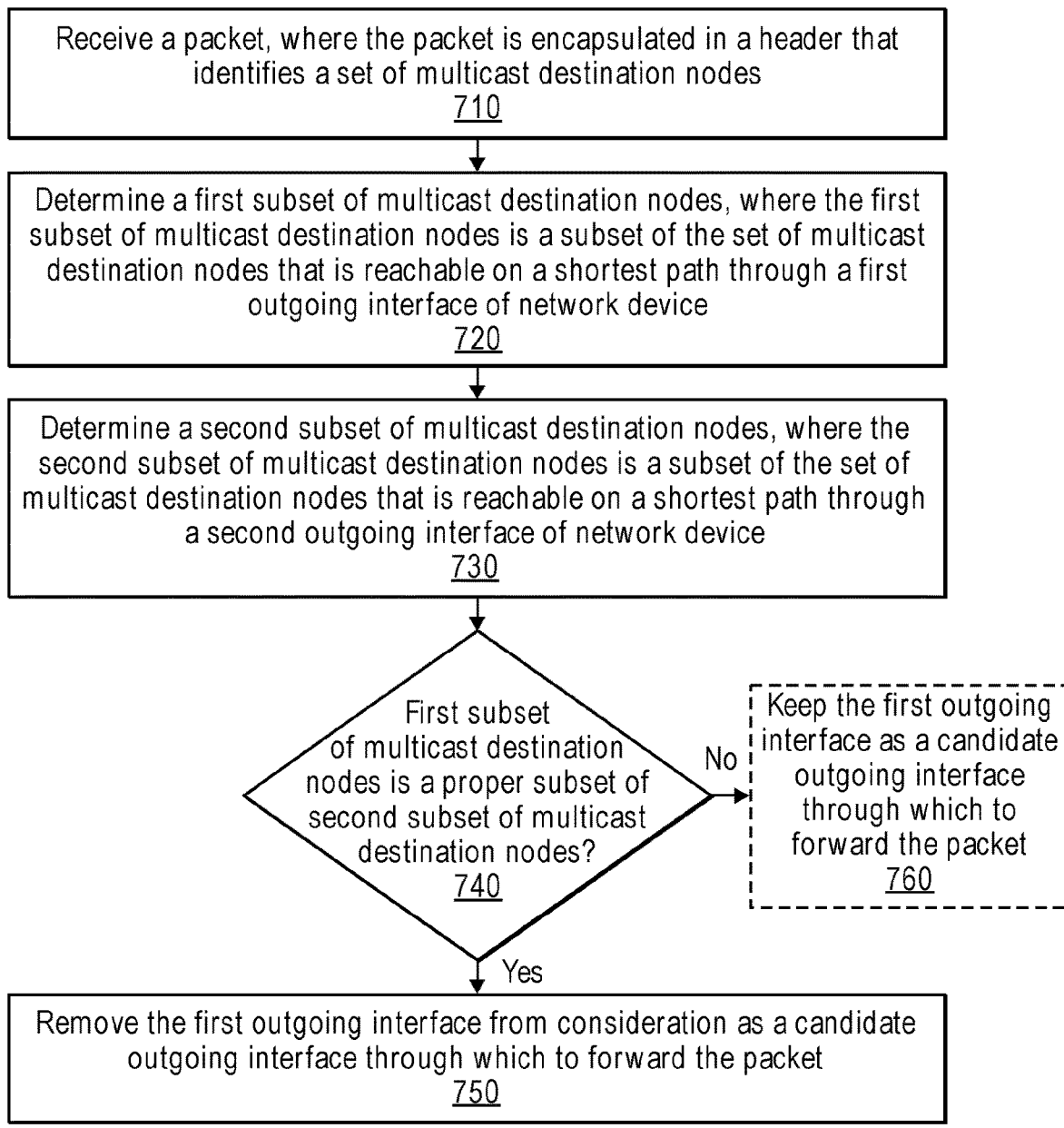
FIG. 7 is a flow diagram of a process for multicasting packets in a multipath network, according to some embodiments.

FIG. 7 is a flow diagram of a process for multicasting packets in a multipath network, according to some embodiments. The process reduces the overall number of hops that copies of a packet traverse in the network to serve a set of multicast destination nodes identified in a packet header of the packet. The process is more general than the process described with reference to FIG. 6 in that it is applicable to both BIER and multicasting protocols other than BIER.

In one embodiment, the process is initiated when the network device receives a packet, where the packet is encapsulated in a header that identifies a set of multicast destination nodes (block 710). In a BIER context, where the network device acts as a BFR, the set of multicast destination nodes is identified in a destination bitstring, where each bit flagged in the destination bitstring represents a multicast destination node to which a copy of the packet should be delivered.

The network device determines a first subset of multicast destination nodes, where the first subset of multicast destination nodes is a subset of the set of multicast destination nodes that is reachable on a shortest path through a first outgoing interface of the network device (block 720). In a BIER context, determining the first subset of multicast destination nodes may include the operations described with reference to block 620.

The network device determines a second subset of multicast destination nodes, where the second subset of multicast destination nodes is a subset of the set of multicast destination nodes that is reachable on a shortest path through a second outgoing interface of the network device (block 730). In a BIER context, determining the second subset of multicast destination nodes may include the operations described with reference to block 630.

The network device then determines whether the first subset of multicast destination nodes is a proper subset of the second subset of multicast destination nodes (decision block 740). In a BIER context, determining whether the first subset of multicast destination nodes is a proper subset of the second subset of multicast destination nodes may include the operations described with reference to block 740.

If the network device determines that the first subset of multicast destination nodes is a proper subset of the second subset of multicast destination nodes, then the network device removes the first outgoing interface from consideration as a candidate outgoing interface through which to forward the packet (block 750). On the other hand, if the network device determines that the first subset of multicast destination nodes is not a proper subset of the second subset of multicast destination nodes, then the network device keeps the first outgoing interface as a candidate outgoing interface through which to forward the packet (block 760).

The network device may repeat blocks 720-760 until the network device determines that all outgoing interfaces of the network device that can only serve a proper subset of the set of multicast destination nodes that can be served by any other outgoing interface of the network device have been removed from consideration. In one embodiment, the network device may ensure this by repeating blocks 720-760 for each possible ordered pair of outgoing interfaces. For example, if the network device has a total of 3 outgoing interfaces labeled X, Y, and Z, respectively, then the network device performs blocks 720-760 for the pairs (X, Y), (Y, X), (X, Z), (Z, X), (Y, Z), and (Z, Y), respectively, where the first entry in the pair is treated as the first outgoing interface and the second entry in the pair is treated as the second outgoing interface.

The network device may then determine one or more outgoing interfaces through which to forward the packet among the one or more candidate outgoing interfaces that were not removed from consideration and forward the packet through the one or more determined outgoing interfaces. Forwarding the packet through an outgoing interface may involve making a copy of the packet, encapsulating the copy of the packet in a header that identifies the updated set of multicast destination nodes (e.g., by pruning the nodes not reachable on the outgoing interface), and transmitting the copy of the packet through the outgoing interface.

It is possible that even after removing certain outgoing interfaces from consideration (e.g., by applying the process described above or similar process), that there are multiple outgoing interfaces available through which a packet can be forwarded to reach a given destination node. In one embodiment, the network device tie-breaks between these outgoing interfaces (the candidate outgoing interfaces that were not removed from consideration) using an entropy value either specified in the packet header or gleaned from packet information.

FIG. 8A illustrates connectivity between network devices (NDs) within an exemplary network, as well as three exemplary implementations of the NDs, according to some embodiments. FIG. 8A shows NDs 800A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 800A, E, and F illustrates that these NDs act as ingress and egress points for the network (and thus, these NDs are sometimes referred to as edge NDs; while the other NDs may be called core NDs).

Two of the exemplary ND implementations in FIG. 8A are: 1) a special-purpose network device 802 that uses custom application-specific integrated-circuits (ASICs) and a proprietary operating system (OS); and 2) a general purpose network device 804 that uses common off-the-shelf (COTS) processors and a standard OS.

The special-purpose network device 802 includes networking hardware 810 comprising compute resource(s) 812 (which typically include a set of one or more processors), forwarding resource(s) 814 (which typically include one or more ASICs and/or network processors), and physical network interfaces (NIs) 816 (sometimes called physical ports), as well as non-transitory machine readable storage media 818 having stored therein networking software 820. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 800A-H. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module) and forwarding table(s) 834A-R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A).

Software 820 can include code such as multicast component 825, which when executed by networking hardware 810, causes the special-purpose network device 802 to perform operations of one or more embodiments of the present disclosure as part of networking software instances 822 (e.g., multicast instance 835A).

The special-purpose network device 802 is often physically and/or logically considered to include: 1) a ND control plane 824 (sometimes referred to as a control plane) comprising the compute resource(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) 834A-R and the physical NIs 816. By way of example, where the ND is a router (or is implementing routing functionality), the ND control plane 824 (the compute resource(s) 812 executing the control communication and configuration module(s) 832A-R) is typically responsible for participating in controlling how data (e.g., packets) is to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

FIG. 8B illustrates an exemplary way to implement the special-purpose network device 802 according to some embodiments. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein software 850. During operation, the processor(s) 842 execute the software 850 to instantiate one or more sets of one or more applications 864A-R. While one embodiment does not implement virtualization, alternative embodiments may use different forms of virtualization—represented by a virtualization layer 854 and software containers 862A-R. For example, one such alternative embodiment implements operating system-level virtualization, in which case the virtualization layer 854 represents the kernel of an operating system (or a shim executing on a base operating system) that allows for the creation of multiple software containers 862A-R that may each be used to execute one of the sets of applications 864A-R. In this embodiment, the multiple software containers 862A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 854 represents a hypervisor (sometimes referred to as a virtual machine monitor (VMM)) or a hypervisor executing on top of a host operating system; and 2) the software containers 862A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 864A-R, as well as the virtualization layer 854 and software containers 862A-R if implemented, are collectively referred to as software instance(s) 852. Each set of applications 864A-R, corresponding software container 862A-R if implemented, and that part of the hardware 840 that executes them (be it hardware dedicated to that execution and/or time slices of hardware temporally shared by software containers 862A-R), forms a separate virtual network element(s) 860A-R.

The virtual network element(s) 860A-R perform similar functionality to the virtual network element(s) 830A-R—e.g., similar to the control communication and configuration module(s) 832A and forwarding table(s) 834A (this virtualization of the hardware 840 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 862A-R differently. For example, while embodiments of the invention are illustrated with each software container 862A-R corresponding to one VNE 860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 862A-R to VNEs also apply to embodiments where such a finer level of granularity is used.

In certain embodiments, the virtualization layer 854 includes a virtual switch that provides similar forwarding services as a physical Ethernet switch. Specifically, this virtual switch forwards traffic between software containers 862A-R and the NIC(s) 844, as well as optionally between the software containers 862A-R; in addition, this virtual switch may enforce network isolation between the VNEs 860A-R that by policy are not permitted to communicate with each other (e.g., by honoring virtual local area networks (VLANs)).

Software 850 can include code such as multicast component 863, which when executed by processor(s) 842, cause the general purpose network device 804 to perform operations of one or more embodiments of the present disclosure as part software containers 862A-R.

The third exemplary ND implementation in FIG. 8A is a hybrid network device 806, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An embodiment of the invention may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method implemented by a network device for multicasting packets in a multipath network, the method being implemented to reduce an overall number of hops that copies of a packet traverse in the multipath network to serve a set of multicast destination nodes, the method comprising:
   receiving the packet, wherein the packet is encapsulated in a header that identifies the set of multicast destination nodes;
   determining a first subset of multicast destination nodes, wherein the first subset of multicast destination nodes is a subset of the set of multicast destination nodes that is reachable on a shortest path through a first outgoing interface of the network device;
   determining a second subset of multicast destination nodes, wherein the second subset of multicast destination nodes is a subset of the set of multicast destination nodes that is reachable on a shortest path through a second outgoing interface of the network device;
   determining whether the first subset of multicast destination nodes is a proper subset of the second subset of multicast destination nodes; and
   removing the first outgoing interface from consideration as a candidate outgoing interface through which to forward the packet in response to determining that the first subset of multicast destination nodes is the proper subset of the second subset of multicast destination nodes.

2. The method of claim 1, further comprising:
   determining one or more outgoing interfaces through which to forward the packet among one or more candidate outgoing interfaces that were not removed from consideration; and
   forwarding the packet through the determined one or more outgoing interfaces.

3. The method of claim 2, wherein determining the one or more outgoing interfaces through which to forward the packet comprises tie-breaking, among the one or more candidate outgoing interfaces that were not removed from consideration, using an entropy value either specified in the packet or gleaned from packet information.

4. The method of claim 2, further comprising:
   determining whether all outgoing interfaces of the network device that can only serve a proper subset of the set of multicast destination nodes that can be served by any other outgoing interface of the network device have been removed from consideration before determining the one or more outgoing interfaces through which to forward the packet.

5. The method of claim 1, wherein the multipath network implements Bit Index Explicit Replication (BIER) and the network device acts as a bit-forwarding router (BFR) in the multipath network.

6. The method of claim 5, wherein the header includes a destination bitstring, and wherein each bit flagged in the destination bitstring represents a multicast destination node to which a copy of the packet should be delivered.

7. The method of claim 6, wherein determining the first subset of multicast destination nodes comprises creating a first bitstring by applying a bit-wise AND operation on the destination bitstring and a first outgoing interface bitstring, wherein the first outgoing interface bitstring identifies one or more BFRs reachable on the shortest path through the first outgoing interface, wherein determining the second subset of multicast destination nodes comprises creating a second bitstring by applying a bit-wise AND operation on the destination bitstring and a second outgoing interface bitstring, and wherein the second outgoing interface bitstring identifies one or more BFRs reachable on the shortest path through the second outgoing interface.

8. The method of claim 7, wherein determining whether the first subset of multicast destination nodes is the proper subset of the second subset of multicast destination nodes comprises determining whether a set of bits flagged in the first bitstring is a proper subset of a set of bits flagged in the second bitstring.

9. A network device configured to multicast packets in a multipath network, the network device being configured to reduce an overall number of hops that copies of a packet traverse in the multipath network to serve a set of multicast destination nodes, the network device comprising:
   a non-transitory machine-readable storage medium having stored therein a multicast component; and
   a processor communicatively coupled to the non-transitory machine-readable storage medium, the processor being configured to execute the multicast component, wherein the multicast component is configured to:
   receive the packet, wherein the packet is encapsulated in a header that identifies the set of multicast destination nodes,
   determine a first subset of multicast destination nodes, wherein the first subset of multicast destination nodes is a subset of the set of multicast destination nodes that is reachable on a shortest path through a first outgoing interface of the network device,
   determine a second subset of multicast destination nodes, wherein the second subset of multicast destination nodes is a subset of the set of multicast destination nodes that is reachable on a shortest path through a second outgoing interface of the network device, determine whether the first subset of multicast destination nodes is a proper subset of the second subset of multicast destination nodes, and remove the first outgoing interface from consideration as a candidate outgoing interface through which to forward the packet in response to a determination that the first subset of multicast destination nodes is the proper subset of the second subset of multicast destination nodes.

10. The network device of claim 9, wherein the multicast component is further configured to determine one or more outgoing interfaces through which to forward the packet among one or more candidate outgoing interfaces that were not removed from consideration and forward the packet through the determined one or more outgoing interfaces.

11. A non-transitory machine-readable medium having computer code stored therein, which when executed by a set of one or more processors of a network device in a multipath network, causes the network device to perform operations for multicasting packets in the multipath network, the operations being performed to reduce an overall number of hops that copies of a packet traverse in the multipath network to serve a set of multicast destination nodes, the operations comprising:

receiving the packet, wherein the packet is encapsulated in a header that identifies the set of multicast destination nodes;

determining a first subset of multicast destination nodes, wherein the first subset of multicast destination nodes is a subset of the set of multicast destination nodes that is reachable on a shortest path through a first outgoing interface of the network device;

determining a second subset of multicast destination nodes, wherein the second subset of multicast destination nodes is a subset of the set of multicast destination nodes that is reachable on a shortest path through a second outgoing interface of the network device;

determining whether the first subset of multicast destination nodes is a proper subset of the second subset of multicast destination nodes; and removing the first outgoing interface from consideration as a candidate outgoing interface through which to forward the packet in response to determining that the first subset of multicast destination nodes is the proper subset of the second subset of multicast destination nodes.

12. The non-transitory machine-readable medium of claim 11, wherein the computer code, when executed by the set of one or more processors of the network device, causes the network device to perform further operations comprising:

determining one or more outgoing interfaces through which to forward the packet among one or more candidate outgoing interfaces that were not removed from consideration; and forwarding the packet through the determined one or more outgoing interfaces.

13. The non-transitory machine-readable medium of claim 12, wherein determining the one or more outgoing interfaces through which to forward the packet comprises tie-breaking, among the one or more candidate outgoing interfaces that were not removed from consideration, using an entropy value either specified in the packet or gleaned from packet information.

14. The non-transitory machine-readable medium of claim 12, wherein the computer code, when executed by the set of one or more processors of the network device, causes the network device to perform further operations comprising:

determining whether all outgoing interfaces of the network device that can only serve a proper subset of the set of multicast destination nodes that can be served by any other outgoing interface of the network device have been removed from consideration before determining the one or more outgoing interfaces through which to forward the packet.

15. The non-transitory machine-readable medium of claim 11, wherein the multipath network implements Bit Index Explicit Replication (BIER) and the network device acts as a bit-forwarding router (BFR) in the multipath network.

16. The non-transitory machine-readable medium of claim 15, wherein the header includes a destination bitstring, and wherein each bit flagged in the destination bitstring represents a multicast destination node to which a copy of the packet should be delivered.

17. The non-transitory machine-readable medium of claim 16, wherein determining the first subset of multicast destination nodes comprises creating a first bitstring by applying a bit-wise AND operation on the destination bitstring and a first outgoing interface bitstring, wherein the first outgoing interface bitstring identifies one or more BFRs reachable on the shortest path through the first outgoing interface, wherein determining the second subset of multicast destination nodes comprises creating a second bitstring by applying a bit-wise AND operation on the destination bitstring and a second outgoing interface bitstring, and wherein the second outgoing interface bitstring identifies one or more BFRs reachable on the shortest path through the second outgoing interface.

18. The non-transitory machine-readable medium of claim 17, wherein determining whether the first subset of multicast destination nodes is the proper subset of the second subset of multicast destination nodes comprises determining whether a set of bits flagged in the first bitstring is a proper subset of a set of bits flagged in the second bitstring.

19. A computing device implementing a plurality of virtual machines for implementing network function virtualization (NFV), wherein a virtual machine from the plurality of virtual machines is configured to multicast packets in a multipath network, the virtual machine being configured to reduce an overall number of hops that copies of a packet traverse in the multipath network to serve a set of multicast destination nodes, the computing device comprising:

a non-transitory machine-readable storage medium having stored therein a multicast component; and a processor communicatively coupled to the non-transitory machine-readable storage medium, the processor being configured to execute the virtual machine, wherein the virtual machine is configured to implement the multicast component, the multicast component being configured to:

determine a first subset of multicast destination nodes, wherein the first subset of multicast destination nodes is a subset of the set of multicast destination nodes that is reachable on a shortest path through a first outgoing interface of the computing device, determine a second subset of multicast destination nodes, wherein the second subset of multicast destination nodes is a subset of the set of multicast destination nodes that is reachable on a shortest path through a second outgoing interface of the computing device, determine whether the first subset of multicast destination nodes is a proper subset of the second subset of multicast destination nodes, and remove the first outgoing interface from consideration as a candidate outgoing interface through which to forward the packet in response to a determination that the first subset of multicast destination nodes is the proper subset of the second subset of multicast destination nodes.

20. The computing device of claim 19, wherein the multicast component is further configured to determine one or more outgoing interfaces through which to forward the packet among one or more candidate outgoing interfaces that were not removed from consideration and forward the packet through the determined one or more outgoing interfaces.

* * * * *